(12) United States Patent
Bucktron et al.

(10) Patent No.: US 7,353,804 B2
(45) Date of Patent: Apr. 8, 2008

(54) METHOD AND ARRANGEMENT FOR ACHIEVING AN ADJUSTED ENGINE SETTING UTILIZING ENGINE OUTPUT AND/OR FUEL CONSUMPTION

(75) Inventors: Edward Bucktron, Lockesburg, AR (US); Derek J. Egerstaffer, Nashville, AR (US); Jason D. Duke, Arlington, TX (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 0 days.

(21) Appl. No.: 10/269,986

(22) Filed: Oct. 15, 2002

(65) Prior Publication Data

US 2004/0069290 A1  Apr. 15, 2004

(51) Int. Cl.
  *F02D 41/00* (2006.01)
(52) U.S. Cl. .............. 123/436; 123/352; 123/434; 123/435; 123/437; 123/672; 73/112
(58) Field of Classification Search ............... 123/672, 123/434, 704, 437, 352, 435, 436; 73/112, 73/113
  See application file for complete search history.

(56) References Cited

U.S. PATENT DOCUMENTS

| | | | | |
|---|---|---|---|---|
| 2,040,778 A | * | 5/1936 | Morgan | .............. 73/112 |
| 2,073,243 A | | 3/1937 | Liddell et al. | |
| 2,450,835 A | * | 10/1948 | Leighton | .............. 123/434 |
| 3,640,255 A | | 2/1972 | Voelz | |
| 4,286,324 A | | 8/1981 | Ingram | .............. 701/123 |
| 4,377,143 A | * | 3/1983 | Hamburg | .............. 123/672 |
| 4,493,303 A | * | 1/1985 | Thompson et al. | .......... 123/357 |
| 4,550,701 A | * | 11/1985 | Suzuki et al. | .............. 123/436 |
| 4,716,872 A | | 1/1988 | Pol | .............. 123/352 |
| 5,107,815 A | * | 4/1992 | Van Duyne | .............. 123/435 |
| 5,158,063 A | * | 10/1992 | Hosoda et al. | .............. 123/676 |
| 5,431,042 A | | 7/1995 | Lambert et al. | |
| 6,014,858 A | * | 1/2000 | Zankowski | .............. 60/274 |
| 6,020,651 A | * | 2/2000 | Nakamura et al. | .......... 290/40 R |
| 6,189,523 B1 | * | 2/2001 | Weisbrod et al. | .............. 123/672 |
| 6,289,877 B1 | | 9/2001 | Weisbrod et al. | .............. 123/480 |
| 6,493,626 B2 | * | 12/2002 | Mitani et al. | .............. 701/103 |

FOREIGN PATENT DOCUMENTS

DE  33 34 622 A1  4/1985  .............. 73/112

* cited by examiner

*Primary Examiner*—T. M Argenbright
(74) *Attorney, Agent, or Firm*—Pearne & Gordon LLP

(57) ABSTRACT

A method and associated arrangement for achieving an adjusted engine setting utilizing engine output and/or fuel consumption. An engine that consumes fuel is run. Fuel consumption and/or engine operation output is determined. A value is determined utilizing the determined fuel consumption and/or the determined engine operation output. The engine setting is adjusted to cause the determined value to change toward a desired value.

46 Claims, 3 Drawing Sheets

METHOD AND ARRANGEMENT FOR ACHIEVING AN ADJUSTED ENGINE SETTING UTILIZING ENGINE OUTPUT AND/OR FUEL CONSUMPTION

FIELD OF THE INVENTION

The present invention relates to adjustment of at least one engine setting, such a carburetor setting. The present invention specifically relates to the adjustment of at least one engine setting to provide for desired engine exhaust emission levels.

BACKGROUND OF THE INVENTION

Regulations concerning engine emission levels require that engine setting(s) be adjusted subsequent to engine production and prior to shipment/use. Specifically, regulations stipulate that levels of $CO/CO_2$ must be within specified range limits. One or more carburetor adjustment settings are largely responsible for engine emission levels for two-stroke engines. Recent regulations regarding the emissions from two-stroke engines have resulted in increased efforts to insure proper adjustment.

Currently, one known method to adjust a carburetor is to make adjustment in connection with monitoring emissions via a $CO/CO_2$ analyzer. The adjustment and emission monitoring process is relatively slow because of lag time associated with achieving accurate analyzer readings subsequent to an adjustment. For example, it may be necessary to wait approximately ten seconds after each adjustment to a carburetor before a $CO/CO_2$ analyzer accurately indicates the resulting emission levels.

SUMMARY OF THE INVENTION

In accordance with one aspect, the present invention provides a method for achieving an adjusted engine setting. The method includes running an engine that consumes fuel and determining fuel consumption. The method includes determining engine operation output. A value utilizing the determined fuel consumption and the determined engine operation output is determined. The engine setting is adjusted to cause the determined value to change toward a desired value.

In accordance with another aspect, the present invention provides a method for achieving an adjusted engine setting associated with an exhaust emission level. The method includes running an engine that consumes fuel, and determining fuel consumption. The method also includes determining a value utilizing the determined fuel, and adjusting the engine setting to cause the determined value to change toward a desired value.

In accordance with another aspect, the present invention provides a method for achieving an adjusted engine setting associated with an exhaust emission level. The method includes running an engine that consumes fuel, and determining engine operation output. The method also includes determining a value utilizing the determined engine operation output, and adjusting the engine setting to cause the determined value to change toward a desired value.

In accordance with yet another aspect, the present invention provides an arrangement for achieving an adjusted engine setting. The arrangement includes a set-up to run an engine that consumes fuel. The arrangement includes means for determining engine operation output. The arrangement includes means for determining a value utilizing the determined fuel consumption and the determining engine operation output. The arrangement includes means for indicating adjustment utilizing the determined value.

In accordance with still another aspect, the present invention provides an arrangement for achieving an adjusted engine setting associated with an exhaust emission level. The arrangement includes a set-up to run an engine that consumes fuel, and means for determining fuel consumption. The arrangement includes means for determining a value utilizing the determined fuel consumption, and means for indicating adjustment utilizing the determined value.

In accordance with yet still another aspect, the present invention provides an arrangement for achieving an adjusted engine setting associated with an exhaust emission level. The arrangement includes a set-up to run an engine that consumes fuel, and means for determining engine operation output. The arrangement includes means for determining a value utilizing the determined engine operation output, and means for indicating adjustment utilizing the determined value.

BRIEF DESCRIPTION OF THE DRAWINGS

The forgoing and other features and advantages of the present invention will become apparent to those skilled in the art to which the present invention relates upon reading the following description with reference to the accompanying drawings, wherein.

DESCRIPTION OF EXAMPLE EMBODIMENT

Figure 1:
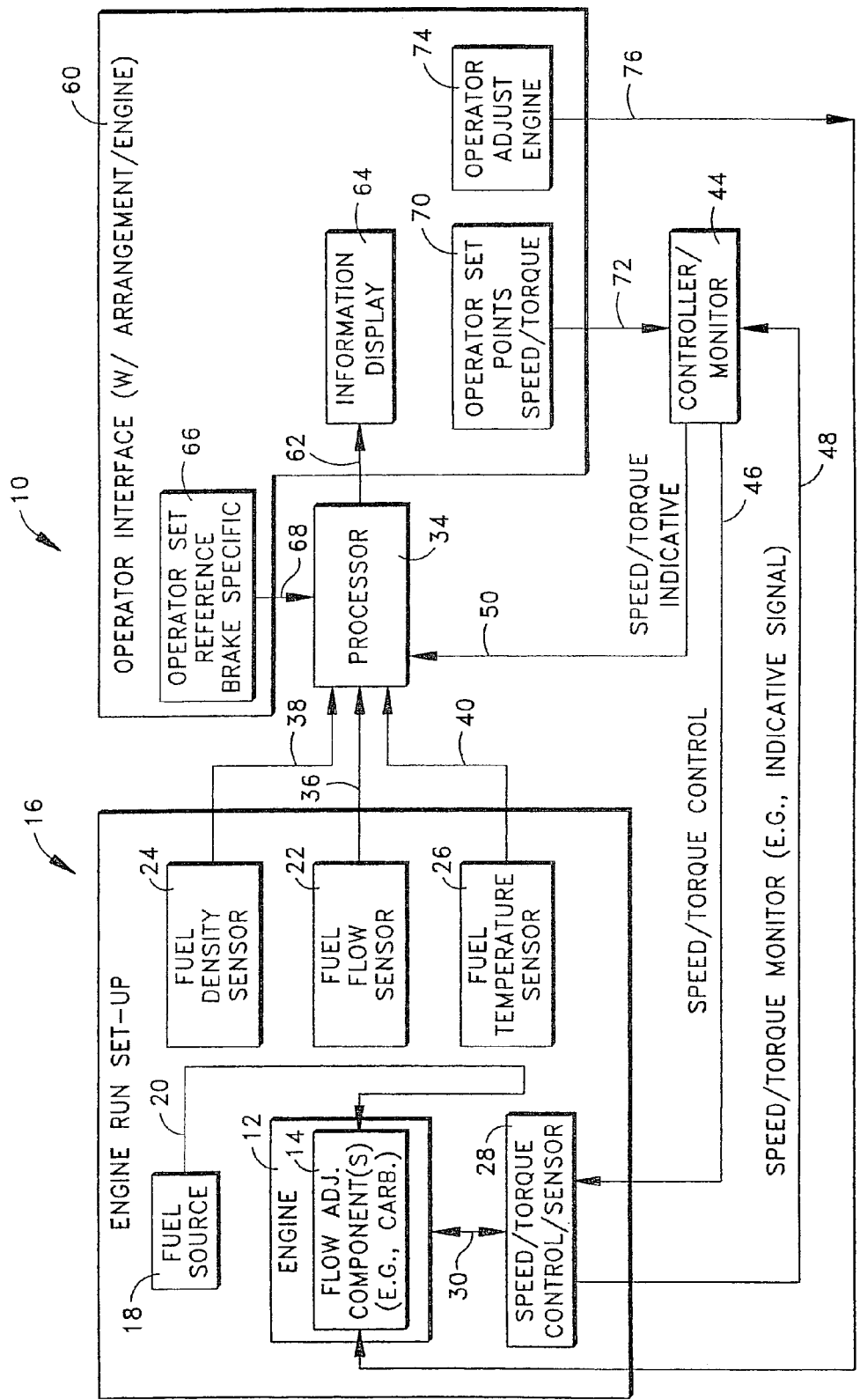
FIG. 1 is a function block diagram of an arrangement for achieving an adjusted engine setting in accordance with the present invention.

One example of an arrangement 10, in accordance with the present invention, for achieving adjustment of an engine 12 is schematically shown in FIG. 1. The engine 12 may be any of several engine types. As such, the engine 12 is schematically shown. However, in one specific example, the engine 12 is a small two-stroke engine that has a rotary output and that is utilized for hand-held tools. Examples of such hand-held tools include chain saws, trimmers, edgers, blowers, and the like. The example engine 12 has a relatively small displacement (e.g., 25 cc).

Subsequent to all or most of the assembly for the engine 12, and prior to final assembly into a hand-held tool and/or shipment, engine setting(s)s are adjusted such that the engine will operate properly and will adhere to applicable exhaust emission regulations. One specific setting that must be adjusted on the two-stroke engine 12 is at least one setting of a carburetor 14. Examples of carburetor settings include the settings for supplies of fuel (e.g., gasoline) and air for combustion within the engine 12. The fuel and air settings can be thought of as flow settings (i.e., fuel flow and/or air flow) of the carburetor 14. As such, the carburetor 14 can be though of as a flow adjustable component.

In order to achieve adjustment of the at least one engine setting (e.g., carburetor adjustment), the arrangement 10 in accordance with the present invention may be utilized. The arrangement 10 includes an engine run set-up 16. The engine run set-up 16 includes all necessary structures, components, devices, etc. that are necessary to support the engine 12, supply fuel to the engine, take or derive necessary sensory information, and control/interact with the engine operation.

The shown engine run set-up 16 includes a fuel source 18 (e.g., a nurse line) that supplies fuel (e.g., gasoline) 20 to the engine 12. A fuel flow sensor 22, a fuel density senor 24, and a fuel temperature sensor 26 operatively interact with the supply of fuel 20 to the engine 12 to derive respective sensory information. The arrangement 10 includes a processor 34 that is operatively connected 36-40 to receive sensory data from the fuel flow sensor 22, the fuel density sensor 24, and the fuel temperature sensor 26.

A speed/torque control/sensor 28 of the engine run set-up 16 interacts 30 with the engine 12 to control the engine output speed and/or the output torque of the engine 12 and to monitor the speed and/or torque of the engine. The speed and the torque are outputs of the engine. The arrangement 10 includes a controller/monitor 44 that is operatively connected 46, 48 to the speed/torque control/sensor 28 within the engine run set-up 16. The operational speed of the engine 12 and the torque output from the engine are controlled and monitored by the controller/monitor 44.

In one example, the speed/torque control/sensor 28 includes a mechanism that provides a resistance or braking force against the output (i.e., speed and/or torque) of the engine. Such resistance or braking force allows the sensing of the output of the engine output. In one example, the speed/torque control/sensor 28 outputs at least one electrical signal that is indicative of the speed and/or torque. In one specific example, the signal has an amperage that is indicative of the speed and/or torque. The controller/monitor monitors the electric signal.

The processor 34 is operatively connected 50 to the controller/monitor 44 such that speed and/or torque indicative information is provided to the processor. The processor 34 utilizes the input information (fuel flow, fuel density, fuel temperature, engine torque and/or engine speed) to determine a value that is indicative of whether the engine setting(s) (e.g., carburetor fuel and/or air setting) is properly adjusted.

In one example, the value indicative of whether the setting(s) is properly adjusted is referred to as a Brake Specific value. It is to be appreciated that a different value indicative of proper adjustment is possible. In the present example, the Brake Specific value is calculated using the following example sequence of equations. First, the processor 34 calculates density of the fuel being supplied to the engine 12. The fuel density is calculated by the following equation:

$$\phi T = \phi T_{DT}/[1 + \alpha(T_{RTD} - T_{DT})]$$

wherein:
 $\phi T$=Calculated density [g/ccm];
 $\phi T_{DT}$=Measured density of the fuel (e.g., gasoline) [g/ccm];
 $\alpha$=Expansion coefficient of fuel [1/° F.];
 $T_{RTD}$=Measured RTD temperature [° F.];
 $T_{DT}$=Measured fuel temperature [° F.].

The processor 34 then determines volume of fuel that is flowing to be utilized by the engine 12. In the example, the processor 34 utilizes the following equation:

$$\text{Volume flow} = [f*3.6]/Kd$$

wherein:
 Volume flow=Calculated volumetric flow [l/h];
 f=Measured frequency of sensor (pulses/second) [Hz];
 Kd=Constant [pulses/cc], sensor-specific value for each flow sensor, provided by sensor manufacturer.

The processor 34 calculates mass flow via the following example equation:

$$\text{Mass flow} = \text{Volume flow}*\phi T$$

wherein:
 Mass flow=Calculated mass flow [kg/h].

The processor 34 also calculates torque. The torque is calculated by the following example equation:

$$\tau = \tau_{COEFF}*I_{AVG}$$

wherein:
 $\tau$=Calculated torque [Nm];
 $\tau_{COEFF}$=Torque coefficient provided on the motor [Nm/Amp];
 $I_{AVG}$=Measured, averaged current that is indicative of engine output [Amps].

With the calculated torque, the processor 34 then calculates power output from the engine 12. The following example equation is utilized to calculate the power:

$$\text{Power} = \tau*\text{Velocity}*1.404*10^{-4}$$

wherein:
 Power=Calculated power [HP];
 Velocity=Measured brake speed [RPM].

With the calculated mass flow and the calculated power, the processor 34 determines the Brake Specific value. The following equation is an example of the Brake Specific value:

$$\text{Brake Specific} = \text{Mass flow}/\text{Power}$$

wherein:
 Brake Specific=Calculated brake specific fuel consumption [kg/(h-HP)].

As mentioned, the Brake Specific value is utilized as an indicator of whether the engine setting(s) is properly adjusted. Specifically, the calculated Brake Specific value may be compared to a reference Brake specific value. Within such an example, when the calculated Brake Specific value is at or acceptably near to the reference Brake Specific value, that individual engine has a properly adjusted engine setting(s).

Turning again to FIG. 1, an operator interface 60 is a schematic representation of the operator of the arrangement 10, the various interactions that the operator has with the arrangement, and the provision of information to the operator from the processor 34. In FIG. 1, it can be seen that the operator interface 60 is operatively connected 62 to receive output information from the processor 34. In the shown example, processor output information is provided to the operator interface via an information display 64. The information that can be displayed for perception by the operator may be numeric values (e.g., the calculated Brake specific value or a difference between calculated and reference), which will change as the engine setting(s) is adjusted, or may be information that is more rudimentary (e.g., adjusted vs. non-adjusted). The provided even information may also indicate a desired adjustment direction and/or amount. As such, it should be appreciated that the amount of processor activity subsequent to the Brake Specific calculation may be related to the type and presentation of information at the operator interface 60.

It is to be appreciated that one aspect 66 of the operator interface 60 may include an operator-set reference Brake Specific value. Specifically, the operator may input 68 the desired reference Brake Specific value to the processor 34 if the processor is to be handling determinations as to whether the calculated Brake Specific is at/near the reference Brake Specific.

The operator interface 60 may also include operator set point speed/torque information 70 that is provided 72 to the controller/monitor 44. Such input information to the controller/monitor 44 is utilized to control the speed/torque at the engine 12 during the adjustment process. The setting 66 of the reference Brake Specific value and the set point speed/torque 70 by the operator allow for the arrangement 10 to be utilized for different engines, engine types, or other variables for which accommodation is necessary for a specific engine to be properly adjusted.

The last shown aspect of the operator interface 60 is for operator adjustment 74 provided 76 to the engine setting(s) (e.g., carburetor) 14. Such adjustment of the engine setting(s) may be at any level of sophistication (e.g., manual adjustment, automated adjustment, remotely controlled, etc.).

It is to be appreciated that the adjustment of the engine setting(s) is in real time during running of the engine 12. Also, it is to be appreciated that the adjustment of the engine setting(s) is relatively expedient in that the information regarding whether adjustment of the engine setting(s) has been achieved is a relatively expedient (i.e., immediately responsive to adjustment) process. It is to be appreciated that there is no need to monitor or utilize engine exhaust emissions within the adjustment process. As such, there is no need to wait for an emission analyzer to monitor for changes in exhaust emissions as a response to an adjustment.

Figure 2:
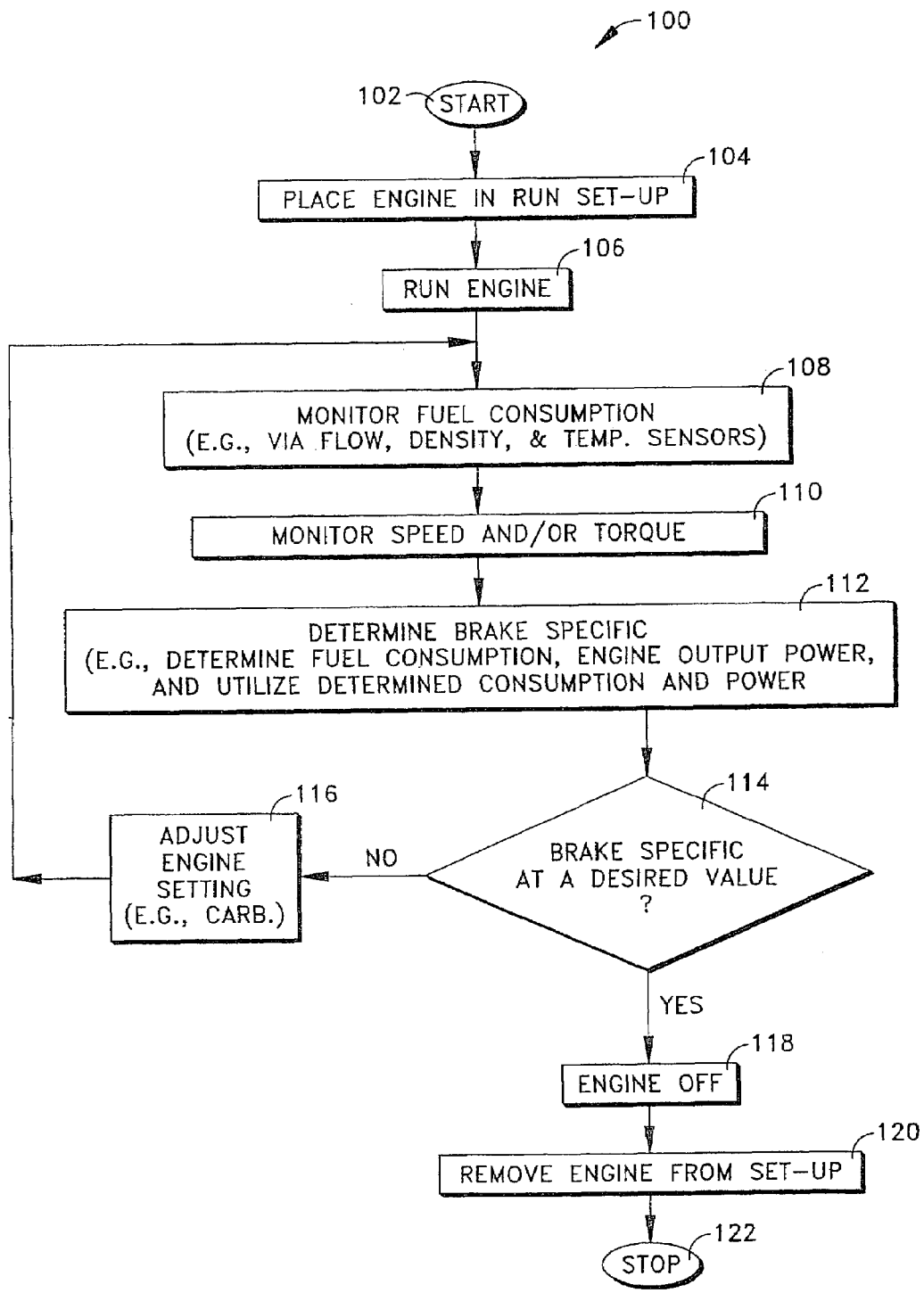
FIG. 2 is a flow chart for a process for achieving an adjusted engine setting in accordance with the present invention.

A flow chart for a process 100 in accordance with the present invention is shown in FIG. 2. The process 100 is initiated at step 102 and proceeds to step 104 in which the engine 12 is placed into the run set-up 16. At step 106, the engine 12 is started to run. At step 108, the fuel consumption of the engine 12 is monitored. For example, the flow, density, and temperature of the fuel are monitored via sensors 22-26. At step 110, the speed and/or torque of the running engine 12 is monitored via the speed/torque control/sensor 28 and the controller/monitor 44.

At step 112, the Brake Specific value is determined. The determination of the Brake Specific value may have various sub steps and may be via various equations and/or means. For example, fuel consumption is determined, engine output (e.g., power) is determined, and the determined fuel consumption and engine output (e.g., power) are utilized to determine the Brake Specific value. At step 114, it is queried whether the Brake Specific value is at a desired value. It is to be appreciated that the Brake Specific value being at a desired value may mean that the Brake Specific value is within an acceptable range.

If the determination at step 114 is negative (i.e., the brake specific value is not at a desired value, and thus the engine setting(s) is not yet properly adjusted), the process 100 goes from step 114 to step 116. At step 116, the engine setting(s) is adjusted. For example, the carburetor 14 is adjusted on the two-stoke engine 12. Subsequent to the adjustment step at step 116, the process 100 loops again to step 108 to repeat the sequence of steps 108-114.

If the determination at step 114 is affirmative (e.g., the Brake Specific value is at the desired value), the process 100 proceeds from step 114 to step 118. At step 118, with the engine settings(s) properly adjusted, the engine 12 is shut off. At step 120, the engine 12 is removed from the set-up 16 and the process 100 terminates at step 122.

Figure 3:
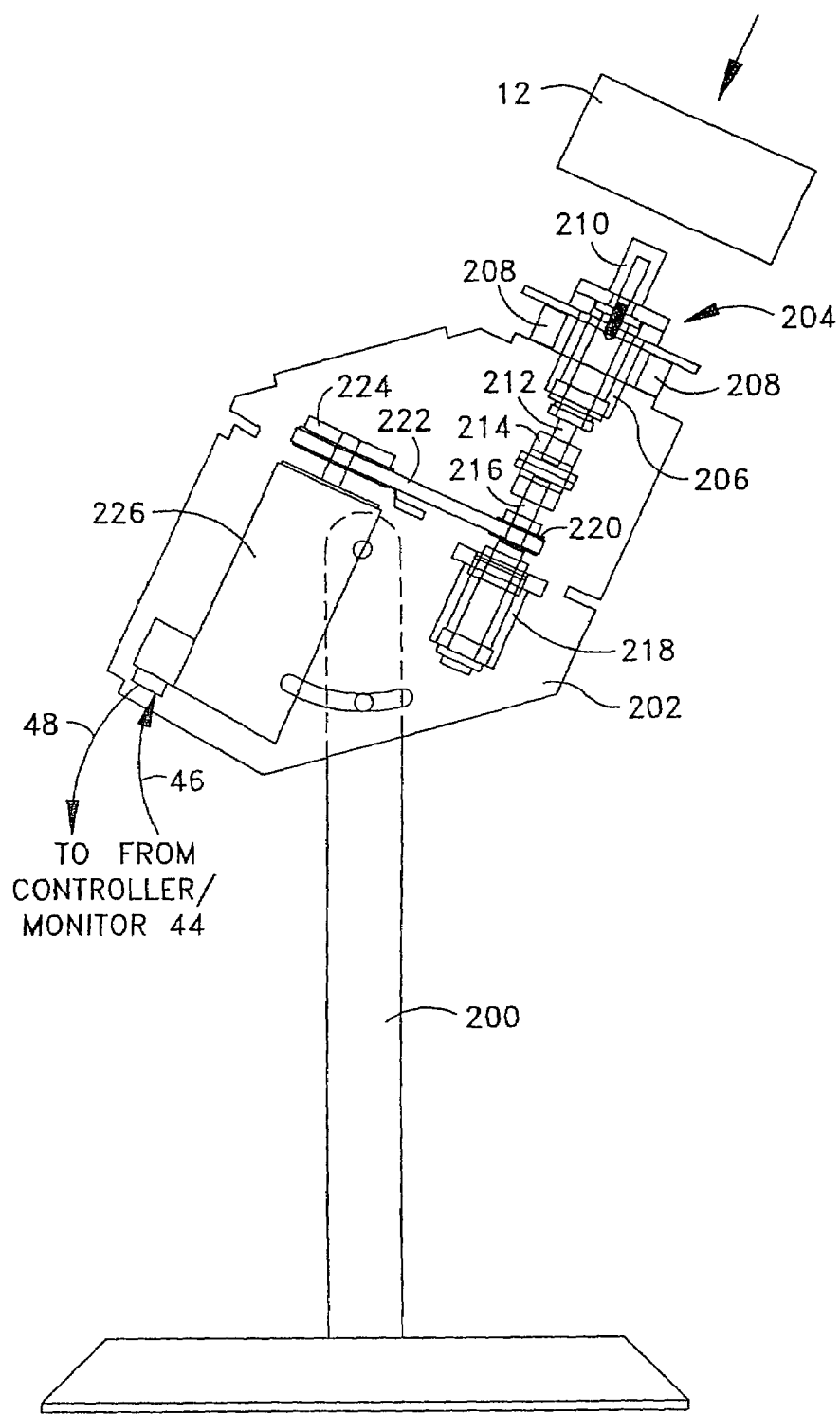
FIG. 3 is a schematic illustration of example components for an engine run set-up of the arrangement shown in FIG. 1.

FIG. 3 illustrates an example construction of a portion of the engine set-up 16 within the arrangement of FIG. 1. Specifically, a stand 200 and pivotable frame 202 is provided that supports a rotational assembly 204. A bearing housing 206 of the assembly is fixed relative to the frame 202. In the shown example, rubber isolators 208 aid in the support of the bearing housing 206 on the frame 202. A portion 210 of the rotational assembly 204 is operatively connectable to a rotational output portion of the engine 12 to be adjusted. The portion 210 can drive the rotational portion of the engine 12, or may be driven by the rotational portion of the engine as is discussed further below.

A shaft 212 extends, downward in the example, from the rotational assembly 204 and is connected to a coupling 214. In turn, a second shaft 216 is connected to the coupling 214. The second shaft 216 extends to another bearing housing 218, which provides rotational support for the second shaft. A timing pulley 220 is mounted on the second shaft 216. As such, rotational force is transferable between the pulley 220 and the rotational output portion of the engine 12 connected to the rotational assembly 204. A timing belt 222 extends from the timing pulley 220 to another timing pulley 224 associated with an electric motor 226 mounted on the frame 202.

The electric motor 226 is operational to rotate the associated pulley 224. As such, operation of the electric motor 226 results in transfer of rotational force to the rotational output portion of the engine 12 connected to the rotational assembly 204. The electric motor 226 can also be driven. When driven, the electric motor 226 acts as a load or resistance brake. Also, when the electric motor 226 is driven, the motor outputs an electrical signal indicative of the driving force applied to the electric motor. In one example, the output signal has a current (i.e., amperage) that is indicative of the driving force. As such, the shown example of FIG. 3 provides at least some of the functions of the speed/torque control/sensor 28 of the arrangement of FIG. 1.

During the method of achieving adjustment of at least one engine setting, the engine 12 is operatively connected (as represented by the schematic arrowhead) to the rotational assembly 204 and supported thereat. The engine 12 is started via rotational force that is supplied from the electric motor 226. Specifically, the electric motor 226 is operated to rotate the associated pulley 224, the timing belt 222, and the timing pulley 220, etc. As such, via the interconnections of the timing belt 222, the pulleys 220, 224, the coupling 214 and the shafts 212, 216, rotational force is delivered to the rotational portion of the engine 12. This aspect provides an auto-start function for the engine 12, in that the initial rotation of the engine is automatically provided.

Once the engine 12 is started, motive force from the electric motor 226 is ceased or overcome by the rotational output of the now running engine 12. As such, rotational force is transmitted back to the motor 226 via the rotational assembly 204, the shafts 212, 216, the coupling 214, the timing pulleys 220, 224, and the timing belt 222. The motor 226 thus provides a resistance or a drag on the output of the engine 12. This drag or resistance can be controlled by the amount of permitted operation of the motor 226.

With the electric motor 226 now creating a load or drag on the output of the running engine 12, the electrical output (via connection 48) is provided by the motor that is indicative of the speed and/or torque of the running engine. This speed and/or torque indicative signal (via connection 48) is provided to the controller/monitor 44, with indicative information subsequently being utilized by the processor 34 within the calculations to determine the Brake Specific value.

The engine 12 can be held at a specific speed or operated to have a specific torque output via provision of a specific braking force provided by the electric motor 226. As such, in the example of FIG. 3, the relationship between adjustment of the engine setting(s) and the braking force provided by the electric motor 226 results in the value indicative of whether the setting(s) is properly adjusted being referred to as a Brake Specific value.

From the above description of the invention, those skilled in the art will perceive improvements, changes and modifications. Such improvements, changes and modifications within the skill of the art are intended to be covered by the appended claims.

What is claimed is:

1. A method for achieving an adjusted combustion component fuel supply static engine setting that controls an input flow supply of fuel, on an engine that consumes fuel, the method including:
    running the engine;
    determining actual fuel consumption;
    determining engine operation output;
    determining a value utilizing the determined actual fuel consumption and determined engine operation output; and
    adjusting the fuel supply static engine setting to cause the determined value to change toward a desired value.

2. A method as set forth in claim 1, wherein the method is performed on an engine that is a two-stroke engine having a carburetor, and the engine setting is a carburetor setting.

3. A method as set forth in claim 1, wherein the step of determining actual fuel consumption is performed in real-time as the engine is running in a set-up different from an intended use environment for the engine.

4. A method as set forth in claim 1, wherein the step of determining a value utilizing the determined actual fuel consumption and determined engine operation output is performed in real-time as the engine is running in a set-up different from an intended use environment for the engine.

5. A method as set forth in claim 1, wherein the step of adjusting the engine setting to cause the determined value to change toward a desired value power is performed in real-time as the engine is running in a set-up different from an intended use environment for the engine and is performed by an operator manually changing the engine setting.

6. A method as set forth in claim 1, wherein the steps of determining actual fuel consumption, determining engine operation output, determining a value utilizing the determined actual fuel consumption and the determined engine operation output, and adjusting the engine setting to cause the determined value to change toward a desired value are performed in real-time as the engine is running in a set-up different from an intended use environment for the engine.

7. A method as set forth in claim 1, wherein the step of determining actual fuel consumption includes determining mass of fuel.

8. A method as set forth in claim 7, wherein the step of determining mass of fuel includes determining density of fuel, determining volume flow of fuel, and determining density flow of fuel using the determined density of fuel and the determined volume flow of fuel.

9. A method as set forth in claim 1, wherein the step of determining engine operation output includes determining an output torque from a rotational member of the engine and determining output power.

10. A method for achieving an adjusted combustion component fuel supply engine setting that controls an input flow supply of fuel, on an engine that consumes fuel, the method including:
    running the engine;
    determining fuel consumption;
    determining engine operation output;
    determining a value utilizing the determined fuel consumption and determined engine operation output; and
    manually adjusting the fuel supply engine setting to cause the determined value to change toward a desired value;
    wherein the desired value is associated with desired carbon monoxide and carbon dioxide levels within exhaust of the engine.

11. A method for achieving an adjusted combustion component fuel supply static engine setting that controls an input flow supply on an engine that consumes fuel, the method including:
    running the engine;
    determining actual fuel consumption;
    determining a value utilizing the determined actual fuel consumption; and
    manually adjusting the fuel supply static engine setting to cause the determined value to change toward a desired value.

12. A method as set forth in claim 11, including determining engine operation output, and the step of determining a value utilizing the determined actual fuel consumption also utilizes the determined engine operation output to determine the determined value.

13. A method for achieving an adjusted combustion component fuel supply engine setting that controls an input flow supply on an engine that consumes fuel, the method including:
    running the engine;
    determining engine operation output;
    determining a value utilizing the determined engine operation output; and
    manually adjusting the fuel supply engine setting to cause the determined value to change toward a desired value wherein the determined value is immediately responsive to any change in the fuel supply engine setting.

14. A method as set forth in claim 13, including determining fuel consumption, and the step of determining a value utilizing the determined engine operation output also utilizes the determined fuel consumption to determine the determined value.

15. An arrangement for achieving an adjusted combustion component fuel supply engine setting that controls an input flow supply to an engine that consumes fuel, the arrangement including:
    a set-up to run an engine that consumes fuel, the set-up being different from an intended use environment for the engine and permits adjustment of the combustion component fuel supply engine setting prior to location of the engine in the intended use environment for the engine;
    means for determining actual fuel consumption;
    means for determining engine operation output;
    means for determining a value utilizing the determined actual fuel consumption and determined engine operation output; and means for indicating adjustment utilizing the determined value.

16. An arrangement as set forth in claim 15, wherein the engine is a two-stroke engine having a carburetor, and the means for indicating adjustment includes means for indicating adjustment of a carburetor setting.

17. An arrangement as set forth in claim 15, wherein the means for determining actual fuel consumption includes means for real time determination of the fuel consumption as the engine is running.

18. An arrangement as set forth in claim 15, wherein the means for determining a value utilizing the determined actual fuel consumption and determined engine operation output includes means for real time determination of the value as the engine is running.

19. An arrangement as set forth in claim 15, including means for controlling engine operation output.

20. An arrangement for achieving an adjusted combustion component fuel supply engine setting that controls an input flow supply to an engine that consumes fuel, the arrangement including:
 a set-up to run an engine that consumes fuel, the set-up being different from an intended use environment for the engine that controls an input flow supply to an engine that consumes fuel;
 means for determining actual fuel consumption;
 means for determining a value utilizing the determined fuel consumption; and
 means for indicating adjustment utilizing the determined value.

21. An arrangement as set forth in claim 20, including means for determining engine operation output, and the means for determining a value also utilizes determined engine operation output.

22. An arrangement for achieving an adjusted combustion component fuel supply engine setting that controls an input flow supply to an engine that consumes fuel, the arrangement including:
 a set-up to run an engine that consumes fuel, the set-up being different from an intended use environment for the engine that controls an input flow supply to an engine that consumes fuel, and the set-up permitting manual adjustment of the fuel supply engine setting;
 means for determining engine operation output;
 means for determining a value utilizing the determined engine operation output; and
 means for indicating adjustment utilizing the determined value.

23. An arrangement as set forth in claim 22, including means for determining actual fuel consumption, and the means for determining a value also utilizes determined actual fuel consumption.

24. A method as set forth in claim 11, wherein the method is performed on an engine that has a carburetor, and the engine setting is a carburetor setting that is manually adjusted.

25. A method as set forth in claim 11, wherein the step of determining actual fuel consumption is performed in real-time as the engine is running.

26. A method as set forth in claim 1, wherein the step of determining a value utilizing the determined actual fuel consumption and determined engine operation output is performed in real-time as the engine is running.

27. A method as set forth in claim 11, wherein the step of adjusting the engine setting to cause the determined value to change toward a desired value power is performed in real-time as the engine is running.

28. A method as set forth in claim 12, wherein the steps of determining actual fuel consumption, determining engine operation output, determining a value utilizing the determined actual fuel consumption and the determined engine operation output, and adjusting the engine setting to cause the determined value to change toward a desired value are performed in real-time as the engine is running.

29. A method as set forth in claim 1, wherein the step of determining actual fuel consumption includes determining mass of fuel.

30. A method as set forth in claim 29, wherein the step of determining mass of fuel includes determining density of fuel, determining volume flow of fuel, and determining mass flow of fuel using the determined density of fuel and the determined volume flow of fuel.

31. A method as set forth in claim 12, wherein the step of determining engine operation output includes determining an output torque from a rotational member of the engine and determining output power.

32. A method for achieving an adjusted combustion component fuel supply engine setting that controls an input flow supply on an engine that consumes fuel, the method including:
 running the engine;
 determining fuel consumption;
 determining a value utilizing the determined fuel consumption; and
 manually adjusting the fuel supply engine setting to cause the determined value to change toward a desired value,
 wherein the desired value is associated with desired carbon monoxide and carbon dioxide levels within exhaust of the engine.

33. An arrangement as set forth in claim 20, wherein the engine is a two-stroke engine having a carburetor, and the means for indicating adjustment includes means for indicating adjustment of a carburetor setting.

34. An arrangement as set forth in claim 20, wherein the means for determining actual fuel consumption includes means for real time determination of the actual fuel consumption as the engine is running.

35. An arrangement as set forth in claim 21, wherein the means for determining a value utilizing the determined actual fuel consumption and determined engine operation output includes means for real time determination of the value as the engine is running.

36. A method as set forth in claim 1, wherein the method is completed such that the adjusted fuel supply engine setting is utilized during all operation of the engine in an intended use environment for the engine.

37. A method as set forth in claim 1, wherein the method is performed in a set-up that is different from an intended use environment for the engine, and the method is performed prior to location of the engine in the intended use of environment of the engine.

38. A method as set forth in claim 1, wherein the combustion component fuel supply engine setting controls the flow of the gasoline.

39. A method as set forth in claim 1, wherein the step of adjusting the fuel supply engine setting is concluded so that the engine can be operationally utilized with the fuel supply engine setting in the adjusted state.

40. A method as set forth in claim 30, wherein the step of determining engine operation includes determining engine output power, the step of determining a value includes determining a brake specific value utilizing the determined mass flow and the determined engine output power, and the step of adjusting the fuel supply engine setting includes adjusting the fuel supply engine setting in response to the determined brake specific value.

41. An arrangement as set forth in claim 15, wherein the intended use environment of the engine is a hand-held power tool, and the arrangement is an arrangement distinct from the hand-held tool and achieves the adjusted combustion component fuel supply power to the engine being located in the hand-held tool.

42. An arrangement as set forth in claim 41, wherein the engine is an engine for a hand-held power tool, and the set up includes structure for interacting with the hand-held power tool engine.

43. An arrangement as set forth in claim 15, wherein the set up includes an electric motor that can drive the engine and that can be driven by the engine.

44. An arrangement as set forth in claim 43, wherein the electric motor starts the engine and provides a resistance to operation of the engine, driving operation of the engine, during the provision of resistance the electric motor outputs an electric signal indicative of output of the engine.

45. A method for achieving an adjusted engine setting, the method including:
running an engine that consumes fuel;
determining fuel consumption;
determining engine operation output;
determining a value utilizing the determined fuel consumption and determined engine operation output; and
adjusting the engine setting to cause the determined value to change toward a desired value;
wherein the step of determining fuel consumption includes determining mass of fuel, which includes determining density of fuel, determining volume flow of fuel, and determining density flow of fuel using the determined density of fuel and the determined volume flow of fuel, and the step of determining engine operation output includes determining an output torque from a rotational member of the engine and determining output power;
wherein the step of determining density of fuel includes calculating fuel density vT by the following equation:

$$\phi T = \phi T_{DT}/(1+\alpha(T_{RTD}-T_{DT}))$$

wherein:
$\phi T$=Calculated density;
$\phi T_{DT}$=Measured density of the fuel;
$\alpha$=Expansion coefficient of fuel;
$T_{RTD}$=Measured RTD temperature;
$T_{DT}$=Measured fuel temperature; and
the step of determining volume flow of fuel includes calculating flow volume by the following equation:

$$\text{Volume flow} = (f*3.6)/Kd$$

wherein:
Volume flow=Calculated volumetric flow;
f=Measured frequency of a sensor;
Kd=Constant, sensor-specific value for each flow sensor; and
the step of determining density flow of fuel using the determined density of fuel and the determined volume flow of fuel includes calculating mass flow via the following equation:

$$\text{Mass flow} = \text{Volume flow} * \phi T$$

wherein:
Mass flow=Calculated mass flow; and
the step of determining an output torque from a rotational member includes calculating torque via the following equation:

$$\tau = \tau_{COEFF} * I_{AVG}$$

wherein:
$\tau$=Calculated torque;
$\tau_{COEFF}$=Torque coefficient provided on the motor;
$I_{AVG}$=Measured, averaged current that is indicative of engine output; and
the step of determining output power includes calculating the output power via the following equation:

$$\text{Power} = \tau * \text{Velocity} * 1.404 * 10^{-4}$$

wherein:
Power=Calculated power;
Velocity=Measured brake speed.

46. A method as set forth in claim 45, wherein the step of determining a value includes determining a brake specific value via the following equation:

$$\text{Brake Specific} = \text{Mass flow}/\text{Power}$$

wherein:
Brake Specific=Calculated brake specific fuel consumption.

* * * * *